LEONCIO T. ANG
RALPH W. CARP
WILLIAM E. HOWARD
MICHAEL SLAVIN
INVENTORS

TYPICAL SYSTEM PERFORMANCE CHARACTERISTICS

LEONCIO T. ANG
RALPH W. CARP
WILLIAM E. HOWARD
MICHAEL SLAVIN
INVENTORS

United States Patent Office 3,485,316
Patented Dec. 23, 1969

3,485,316
AUTOMOBILE SPEED CONTROL
Michael Slavin and Ralph Wolf Carp, Baltimore, William
Edward Howard, Lutherville, and Leoncio T. Ang,
Baltimore, Md., assignors to The Bendix Corporation,
a corporation of Delaware
Filed Nov. 29, 1966, Ser. No. 597,789
Int. Cl. F02d 11/10; B60k 27/00
U.S. Cl. 180—105                                      15 Claims

ABSTRACT OF THE DISCLOSURE

An automobile speed control system utilizing a double electrical feedback principle wherein an electrical voltage proportional to command speed is combined with electrical feedback voltages proportional to actual automobile speed and throttle position, and including a memory device into which a command speed essentially equal to a present attained speed may be set by the momentary actuation of a pushbutton.

---

Figure 1:
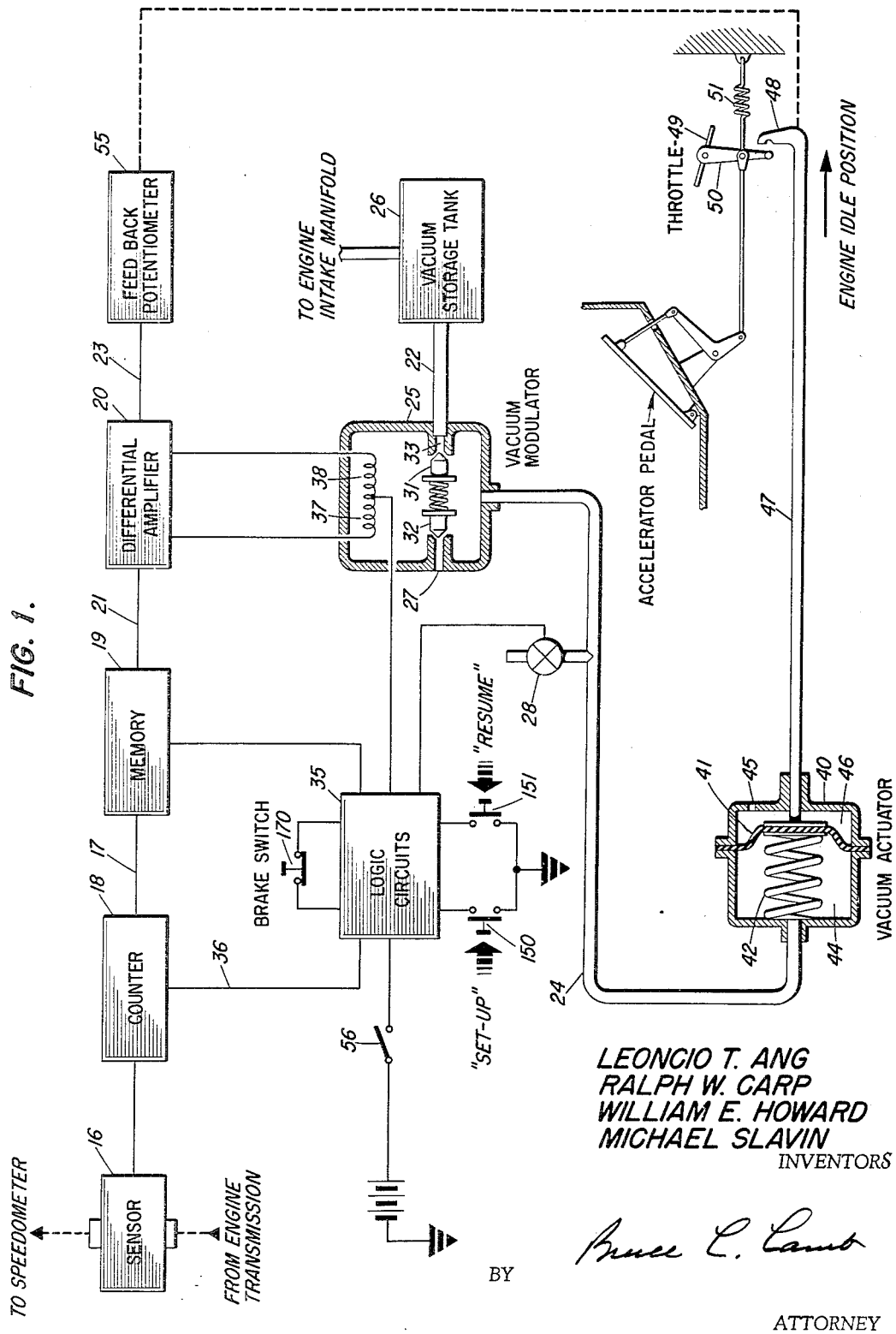

This invention relates to improvements in automobile speed control systems and more particularly to systems having automatic speed setting features and in addition, to systems having certain automatic safety features more popularly called "fail-safe" modes of operation. The invention employs several components of the type generally disclosed in pending application Ser. No. 550,744, filed May 17, 1966 (now Patent No. 3,381,771) and assigned to the assignee in the present application. The prior disclosure is specifically referred to below and hereby incorporated by reference.

Recent developments have allowed simplified speed control systems to be mass produced at a cost attractive to passenger car buyers. These new speed controls have relied on electronic amplifier and feedback principles, thus reducing the number of mechanical elements to a minimum and additionally simplifying the remaining mechanical elements. The result has been the production of control systems lighter in weight and more compact permitting simplified installation in the automobile. In addition, electronic speed controls provide improved accuracy, stability and reliability.

Electronic speed control systems of the referenced type employ a double feedback principle, whereby three electrical signals proportional to, respectively, actual vehicle speed, command vehicle speed and throttle position are combined to produce an error signal. The electrical signal proportional to command speed has been typically obtained from a dashboard mounted speed command potentiometer which was set manually by the operator through the use of a knob and calibrated dial. The speed command potentiometer and its associated knob and dial must be maintained in proper calibration to ensure that the speed set by the operator will be the actual speed which the vehicle attains. In addition, the operator must take his eyes off the road for an extended period of time while setting the command speed into the potentiometer, thus creating a safety hazard.

It is desirable that an automobile speed control system operator in a fail-safe mode so that an operator will not unexpectedly discover that his vehicle is accelerating out of control. The operator must also have readily available means to defeat the automatic speed control so as to easily return to manual control of the vehicle when traffic and road conditions so warrant.

An object of the present invention is to provide an automobile speed control system which will automatically maintain an attained speed merely through the momentary actuation of a pushbutton.

Another object is to provide a fail-safe automobile speed control stystem which will return the vehicle to manual control upon the failure of power or pressure fluid.

Still another object is to provide a speed control system which can be temporarily disabled so that manual control is restored to the operator until such time that the operator desires to return to automatic control. During the time that the system is temporarily disabled, the command speed as originally set into the system should remain unchanged in a system memory.

A still further object is to provide for automatic erasure of the system memory upon the occurrence of certain events.

Briefly, the invention comprises a speed control system wherein a D.C. voltage representing the vehicle speed is generated as the vehicle moves forward. Upon the momentary actuation of a pushbutton by the opeartor, a command speed voltage essentially equal to the instantaneous magnitude of voltage representing vehicle speed is impressed across an energy storage capacitor which is characterized by its low leakage paths and is in the nature of a memory. This command speed voltage is combined in a field effect transistor differential amplifier with the voltage corresponding to actual vehicle speed voltage and a feedback voltage representing the throttle position. The error signal developed is amplified and applied to a vacuum modulator controlling a throttle positioning mechanism which will tend to increase throttle if the actual speed falls below command speed and will tend to decrease throttle if the actual speed exceeds command speed.

Logic circuits are provided which prevent the speed control system from acquiring or maintaining control if the vehicle speed is below a preset minimum. Certain other safety and fail-safe functions are performed in the logic circuits.

Figure 2:
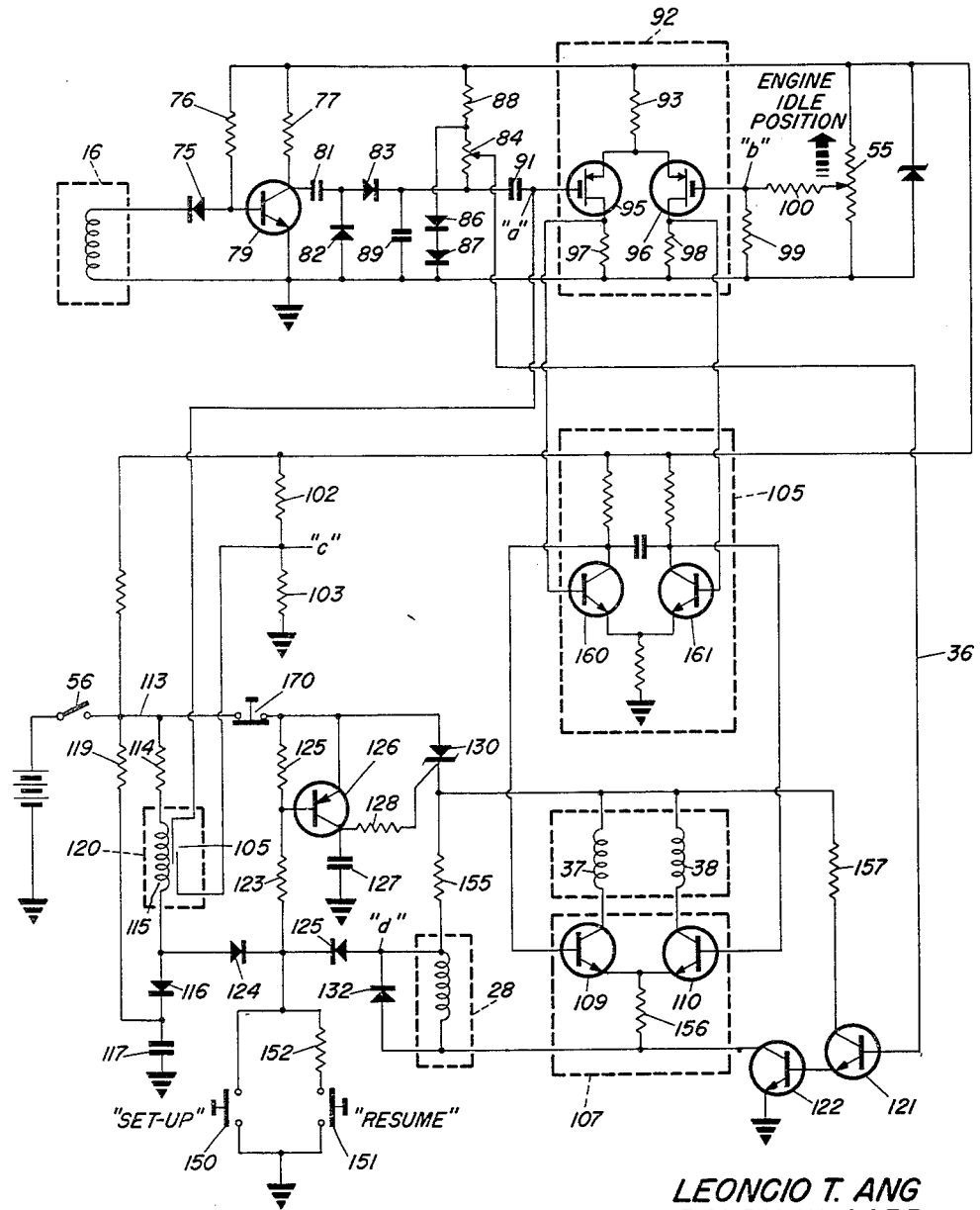
Figure 3:
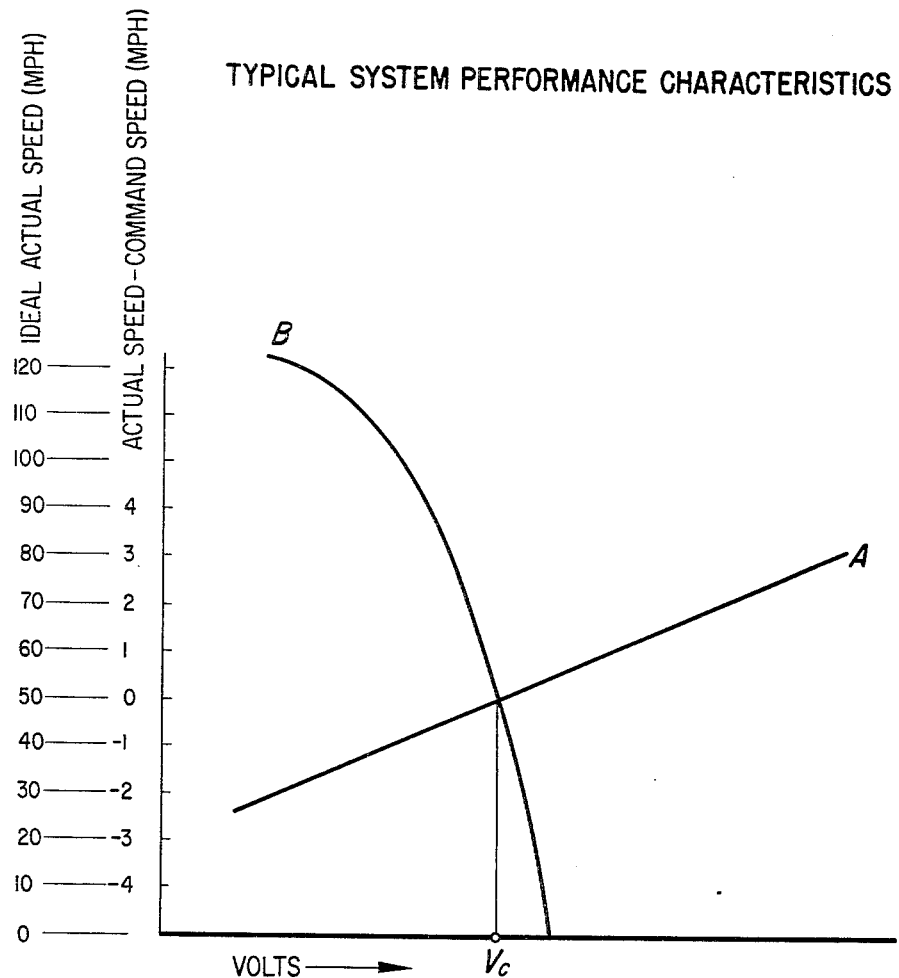

In the drawings:
FIG. 1 is a functional block diagram of the speed control of the invention;
FIG. 2 is a schematic diagram of the electronic control circuitry shown in block form in FIG. 1; and
FIG. 3 is a plot of typical performance characteristics using a possible set of system parameters.

FIG. 1 illustrates the speed control system of the invention in a functional block diagram. The sensor 16 is connected into the speedometer cable and driven at the same speed as the speedometer. Since the gear ratio between the drive wheels and the speedometer cable is fixed, the sensor output frequency is proportional to the automobile speed. The sensor 16 drives a counter 18 which generates a D.C. voltage level proportional to the signal input frequecy. The output of counter 18 is, therefore a D.C. voltage level proportional to vehicle speed. The counter output drives through memory 19 into a high input impedance differential control amplifier 20. The operator can impress a command speed signal proportional to the instantaneous speedometer indicated speed of the automobile by momentarily depressing the set-up pushbutton of logic circuit 35. The set-up pushbutton would normally be mounted on the steering column or, more conveniently, directly on the steering wheel. The voltage appearing on line 21 is dependent on automobile speed (voltage on line 17) and the command speed stored in memory 19. Hence, as the automobile speed tends to vary, the voltage on line 21 varies. A feedback potentiometer 55 provides a signal voltage proportional to the position of throttle linkage arm 48. This voltage appears on line 23. The voltage appearing on line 21 is combined with the voltage on line 23 in differential control amplifier 20. The differential amplifier output control voltages are used to control vacuum modulator 25. The vacuum modulator is described in detail in U.S.

patent application Ser. No. 420,061, filed Dec. 21, 1964 (now Patent No. 3,315,730) by Richard D. Weaver et al. for "Control System for Automobile Air Conditioners." Briefly, the valve includes opposed needle valves 31 and 32 which are positioned reciprocally against ports 33 and 27, either to admit through port 27 atmospheric pressure to the interior of modulator 25 or to reduce the interior pressure of modulator 25 by opening valve 31 which communicates through port 33 to a source 26 maintained at sub-atmospheric pressure by the engine intake manifold vacuum. The operation of modulator 25 is dependent upon the sense of the signal in windings 37 and 38.

Vacuum actuator 40 includes flexible diaphragm 41 which divides actuator 40 into chambers 44 and 46. Chamber 44 is leak tight and communicates through conduit 24 with modulator 25. Chamber 46 is open to the atmosphere through port 45. Spring 42 is disposed in chamber 44 and tends to urge diaphragm 41 and connecting linkage 47 to the right or to a position of engine idle. Throttle crank 50 is urged to the right by spring 51, tending to abut linkage arm 48 so as to rotate throttle 49 to a position of engine idle. While the speed system is operating chamber 44 is exposed to sub-atmospheric pressure by the opening of valve 31. Diaphragm 41 moves into chamber 44, compressing spring 42 until the reduced pressure in chamber 44 plus the spring pressure equals atmospheric pressure. Linkage 47 with arm 48 are carried by diaphragm 41 to force abutting crank 50 to the left, opening throttle 49. It may be readily seen that an operator at any time may increase speed by depressing the accelerator pedal. When the accelerator pedal is released, crank 50 will fall against linkage arm 48 and the speed control system will regain control.

A dump solenoid 28 is disposed on conduit 24 and is maintained closed by logic 35 while the control system is operating. If the solenoid is opened, chamber 44 vents to atmospheric pressure. Diaphragm 41 moves to the right, returning linkage 47 to a position corresponding to engine idle. The operator may then control the throttle through the accelerator pedal.

FIG. 2 illustrates the schematic construction of the system. Sensor 16 may suitably be a variable reluctance alternating current type generator providing a signal having a frequency varying directly as the rotor speed and consequently as the automobile road speed. A limiter transistor 79, normally biased into saturation by resistor 76, receives the output of sensor 16 through temperature compensating diode 75. Negative half cycles of the output of sensor 16 bias transistor 79 non-conductive. The output of transistor 79 therefore consists of positive pulses of fixed amplitude with a frequency proportional to automobile road speed. These speed pulses are applied to the counter circuit of the energy storage type comprising diodes 82 and 83 and capacitors 81 and 89. A voltage proportional to actual automobile road speed appears across capacitor 89, shunted by potentiometer 84 and temperature compensating diodes 86 and 87 forward biased by resistor 88. The potentiometer is preset to sample a voltage proportional to automobile speed, delivering this sampled voltage to the logic circuits through line 36. This sampled voltage represents a threshold speed below which the speed control system will not operate. How this is performed in the logic circuits will be discussed below. Feedback potentiometer 55 connected across an A+ regulated voltage supplies a voltage proportional to throttle position through a voltage divider comprised of resistors 99 and 100 to the gate connection of field effect transistor 96. A low leakage loss memory capacitor is connected between the input terminal of capacitor 89 and the gate connection of field effect transistor 95. Field effect transistors are characterized by their extremely high gate impedance so that memory capacitor 91 is essentially open circuited at the transistor gate connection.

Point c is maintained at a low positive voltage potential by the voltage divider connected to the regulated A+ voltage and comprised of resistors 102 and 103. If point a is connected to point c by the momentary closing of switch contacts 105, a voltage is impressed across memory capacitor 91 equal to the voltage at that instant across capacitor 89 less the small voltage at point c. Since the voltage across capacitor 89 at the instant contacts 105 opened is proportional to the automobile speed at that instant, a command speed voltage essentially proportional to actual vehicle speed at the instant contacts 105 open is impressed on memory capacitor 91. Since capacitor 91 is connected to the high impedance gate circuit of transistor 95, the command speed voltage impressed on memory capacitor 91 will remain practically constant after contacts 105 open. If the automobile speed remains constant after contacts 105 open, then the voltage on point a will remain constant and equal to the voltage on point c. If thereafter the automobile speed decreases, the voltage across capacitor 89 will decrease and the voltage on point a will decrease a proportional amount.

Field effect transistors 95 and 96, and resistors 93, 97 and 98 comprise field effect transistor differential amplifier 92. The outputs of amplifier 92 drive two additional stages of differential amplification 105 and 107. Amplifier stage 107 includes differentially connected transistors 109 and 110 loaded by modulator coils 37 and 38 respectively. Power to amplifier stage 107 is supplied by the logic circuits 35 through silicon controlled rectifier 130.

Ignition switch 56 controls application of power to the control system. Upon closing of the ignition switch 56 a power surge appears on line 113. The surge flows to ground through capacitor 117, diode 116, resistors 114 and 119 and coil 115 of the reed switch 120. The surge through coil 115 energizes the coil sufficiently to cause contacts 105 to close momentarily. If the automobile is not moving as ordinarily would be the case when the ignition switch is initially closed, as in this example, the voltage impressed across memory capacitor 91 by the momentary closing of contacts 105 is essentially proportional to zero command speed. Hence, any previous command speed impressed on memory capacitor 91 is erased.

After ignition switch 56 is closed and voltage on line 113 returns to steady state conditions, capacitor 117 becomes fully charged and stops conducting, deenergizing coil 115. Additionally, diode 116 is back biased through resistor 119 preventing random surges on line 113 from energizing coil 115. Random surges will be harmlessly bled to ground through resistor 119 and capacitor 117.

As automobile speed increases, voltage across capacitor 89 increases and a voltage proportional to automobile speed appears on the base of logic transistor 121 through line 36. The proportionality of transistor 121 base voltage to automobile speed voltage is dependent on the setting of potentiometer 84. Potentiometer 84 is preset to a threshold automobile speed which must be attained before transistor 121 will conduct. Once the automobile has attained a speed in excess of the preset threshold speed, the operator may impress a command speed equal to instantaneous automobile speed by momentarily depressing set-up button 150. This energizes coil 115 through resistor 114 and diode 124, momentarily closing contacts 105 impressing on memory capacitor 91, as has previously been discussed, essentially the same voltage then across capacitor 89. Simultaneously, a voltage appears on the base of transistor 126 from resistors 123 and 125. Transistor 126 turns on, supplying a turn on voltage through resistor 128 to the gate of silicon controlled rectifier 130. Rectifier 130 turns on supplying power to the coil of dump solenoid 28 through resistor 155. Rectifier 130 also supplies power through resistor 157 to the collector connection of logic transistor 121. Since the actual automobile speed now exceeds the preset threshold speed, transistor 121 is conducting, turning on logic transistor 122 so as to complete the dump solenoid coil circuit to ground. The dump solenoid is arranged to close upon energizing. Rectifier 130 additionally supplies power to final amplification stage 107 through modulator coils 37 and 38.

It was previously noted that dump solenoid 28 is open and linkage 47 is all the way to the right in the idle position, while the speed control system is inoperative. Since feedback potentiometer 55 is controlled by linkage 47 during the time the speed control system is inoperative and the throttle is being controlled by the accelerator, the arm of the feedback potentiometer 55 is driven to its high voltage extreme and the voltage at point $b$ remains a maximum while the system is inoperative. As soon as the set-up button is depressed, the system becomes energized as previously explained. Voltage at $b$ exceeds the voltage at $a$ causing field effect transistor 96 to become less conductive and transistor 95 to become more conductive. This causes the voltage on the base of transistor 160 to increase and the voltage on the base of transistor 161 to decrease. This in turn decreases the voltage on the base of transistor 109 and increases the voltage on the base of transistor 110. Less current flows through modulator coil 37 allowing vent port 27 to remain closed, but increased current flow through modulator coil 38 opens vacuum port 33. Vacuum source 26 now communicates through port 33, modulator 25 and conduit 24 with vacuum actuator chamber 44. Atmospheric pressure in chamber 46 forces diaphragm 41 to the left carrying with it linkage 47. The arm of feedback potentiometer 55 connected to linkage 47, moves with linkage 47 to decrease the voltage at point $b$. Since the movement of the linkage 47 is not instantaneous, the automobile will tend to slow slightly. This decreases the voltage at point $a$ thereby generating an error signal in differential amplifier 20 to open the throttle still further and the automobile will continue to accelerate until the actual automobile speed equals command speed.

Potentiometer 55 and resistors 99 and 100 are so chosen that the voltage at point $b$ is equal to the voltage at point $c$ at some convenient approximately midpoint position of the throttle. Additionally, these elements are so chosen that the voltage variation at point $b$ as the throttle swings from idle to full open is very small. Sensor 16 and counter 18 are so designed that the voltage change at point $a$, as actual automobile speed deviates from command speed, is large compared to the possible voltage variation at point $b$. An operating speed control system having excellent control characteristics had a total possible voltage variation at point $b$ equal to the voltage variation at point $a$ resulting from an actual vehicle speed deviation from command speed of 2.5 m.p.h.

FIG. 3 illustrates the feedback characteristics discussed above. For the purpose of interpreting FIG. 3, ideal actual speed is defined as the speed an ideal automobile would attain with a given throttle opening under unvarying engine loading and driving conditions. Curve B is a plot of ideal actual speed versus feedback voltage at point $b$ of FIG. 2 and illustrates the nonlinearity of throttle setting compared with automobile speed. Curve A is a plot of actual speed less command speed versus voltage at point $a$ on FIG. 2. Vc is the voltage at point $c$ of FIG. 2. Note that total voltage swing at $b$ is equal to the voltage swing at point $a$ as actual speed varies 2.5 m.p.h. from command speed. FIG. 3 represents a system having a design equilibrium point at 50 m.p.h., that is, with both command and actual speeds equal to 50 m.p.h., the feedback voltages at $a$ and $b$ are equal to Vc. From the discussion on the operation of the control system, it is apparent that the system can attain equilibrium only when the voltage at point $a$ equals the voltage at point $b$, that is, where constant voltage (vertical) lines intersect curves A and B. Referring to the curves:

Ideal actual speed=70 m.p.h.

at equilibrium:

Actual speed—Command speed=—0.3 m.p.h.

Therefore, a command speed of 70.3 m.p.h. must be set to achieve a controlled speed of 70 m.p.h. Similarly, at a command speed of 100 m.p.h., actual speed will be 99 m.p.h. At a command speed of 30 m.p.h., actual speed will be 30.2 m.p.h. This is well within the tolerance range of commercial speedometers.

Ideally constant driving conditions have been assumed. In actual operation, an automobile encounters a wide variety of driving conditions, such as wind from various directions, hills, curves and rough roads. Assuming that command speed is 60 m.p.h., FIG. 3 shows that actual speed will be 59.9 m.p.h. If the automobile now starts up hill, the speed will decrease causing the voltage at point $a$ to fall. This will tend to open the throttle further until once again equilibrium is achieved. If the loading caused by the hill is equivalent to 10 m.p.h. additional throttle opening, the error increases to 0.2 m.p.h. In other words, equilibrium is restored when actual speed decreases to 59.8 m.p.h. A reverse process occurs when the automobile goes down hill. Less throttle opening is required to maintain speed and the actual speed must increase slightly to maintain equilibrium.

Referring again to FIG. 2, if while operating the automobile under automatic speed control, the operator depresses the brake, brake switch 170 will open, immediately deenergizing and opening dump solenoid 28 to vent actuator chamber 44 to atmosphere. Linkage 47 is driven by actuator 40 to the engine idle position. Modulator windings 37 and 38 are deenergized and logic transistors 121, 122 and 126 and rectifier 130 are turned off. Complete manual control of the automobile has been reestablished. Upon release of the brake, switch 170 closes but diodes 124 and 125 prevent reestablishment of the bias voltage on the base of logic transistor 126. Any voltage surges caused by the closing of switch 170 are grounded through capacitor 127 without turning on silicon controlled rectifier 130. If the resume pushbutton 151 is now depressed, the base bias voltage on transistor 126 is established and the system is latched on. While resume pushbutton 151 is depressed resistors 152 and 114 prevent reed switch coil 115 from becoming energized so contacts 105 do not close and the command speed voltage impressed on the memory capacitor remains unchanged. The automobile then accelerates to the command speed previously set.

If set-up button 150 is depressed while the control system is operating, point $d$ is grounded through diode 125 deenergizing dump solenoid 28. Chamber 44 of actuator 40 is vented to atmosphere driving linkage 47 and arm 48 to the idle position. Additionally, reed switch coil 115 will be energized closing contacts 105. The automobile will coast until set-up button 150 is released, at which time the dump solenoid will be reenergized and closed, reestablishing automatic speed control. Since releasing set-up button 150 also deenergizes reed switch coil 115, contacts 105 open leaving a new command speed voltage across memory capacitor 91 equivalent to the actual automoble speed at that instant.

While we have taught what we consider to be the preferred embodiment of our invention, it is obvious that certain changes and modifications can be made by one skilled in the art.

The invention claimed is:

1. In a speed control system for automobiles having throttle regulated propulsive means, ignition switch and brakes, said control system including a pressure fluid source, a pressure fluid actuator for positioning said throttle, a pressure fluid modulator regulating the fluid pressure at said actuator and electric control means for said modulator wherein a first electrical signal corresponding to actual automobile speed, a second electrical signal corresponding to the position of said throttle, and a third electrical signal corresponding to an operator selected command speed are combined to provide an error signal, said error signal being amplified so as to control the fluid pressure at said modulator, the improvement comprising:
memory means for storing said command speed electrical signal,
memory enabling means whereby said command speed electrical signal is stored in said memory means, said command speed signal being derived from and essentially equal to the instantaneous magnitude of said first electrical signal when said memory enabling means is actuated, and
wherein said means combining said first, second and third electrical signal is characterized by high input impedance.

2. A speed control system as claimed in claim 1 wherein said memory means comprises a capacitor means and said means combining comprises a field effect transistor amplifier having at least one field effect transistor, said capacitor means being connected to couple said first signal to the gate of said transistor, said memory enabling means comprising a voltage source and means for momentarily connecting said voltage source to said transistor gate.

3. A speed control system as claimed in claim 1 with additionally switch means controlling the application of power to said speed control system, and
logic means responsive to the magnitude of said first electrical signal and arranged to maintain said speed control system in an operative condition while the automobile speed is in excess of a preset speed.

4. A speed control system as claimed in claim 1 wherein the pressure fluid is atmospheric air.

5. A speed control system as claimed in claim 1 with additionally:
means for removing the stored signal from said memory means when the automobile ignition switch is initially activated.

6. A speed control system as claimed in claim 1 wherein said second electrical signal is generated by a potentiometer having a moveable element coupled to said pressure fluid actuator.

7. A speed control system as claimed in claim 1 and additionally:
means temporarily disabling said speed control system, and
means reenabling said speed control system.

8. A speed control system as claimed in claim 7 wherein the means temporarily disabling comprises:
a latching logic means responsive to a preset automobile speed supplying power to said fluid pressure modulator,
a first switch means controlling application of power to said logic means, an interruption of power causing said logic means to unlatch,
a pressure fluid enabling means responsive to said logic means, and
wherein said means reenabling comprises a second switch means relatching said first logic means.

9. In a speed control system for automobiles having throttle regulated propulsive means, brakes, and an ignition switch, said speed control system including a throttle positioning means for positioning said throttle and control means for controlling said throttle positioning means wherein a first electrical signal corresponding to actual automobile speed, a second electrical signal corresponding to the position of said throttle, and a third electrical signal corresponding to an operator selected command speed are combined to provide an error signal, said error signal being amplified so as to control said throttle positioning means, the improvement comprising:
memory means for storing said command speed electrical signal,
memory enabling means whereby said command speed electrical signal is stored in said memory means, said command speed signal being derived from and essentially equal to the instantaneous magnitude of said first electrical signal when said memory enabling means is actuated,
latching logic means responsive to the magnitude of said first electrical signal and arranged to maintain said speed control in an operative condition while automobile speed exceeds a preset speed, said logic means being additionally arranged to enable said memory means upon initial closing of said ignition switch,
first switch means controlling application of power to said logic means, the opening of said switch means causing said logic means to unlatch, and
second switch means relatching said logic means.

10. An electronic control system for combining first and second realtively slowly varying signal voltages with a relatively constant command signal voltage to produce control signals, said electronic control system including a first source of said first relatively slowly varying signal voltages and a second source of said second relatively slowly varying signal voltages, comprising:
an amplifier having first and second input signal ports, said first port being characterized by a high input impedance and said second signal voltage source being connected to said second input port,
capacitive means connected between said first signal voltage source and said first signal input port,
a voltage source,
means momentarily connecting said voltage source to said first signal input port, the voltage at that time impressed across said capacitive means comprising said command voltage; and
means sensing voltages in said amplifier, said amplifier voltages comprising said control signals.

11. A control system as claimed in claim 10 wherein said control signals are differential and said amplifier includes a pair of field effect transistors, each having gate, source, and drain electrodes, one of said gate electrodes being said first signal input port and the other of said gate electrodes being said second signal input port.

12. A control system as claimed in claim 10 wherein said capacitive means comprises a capacitor and said momentarily connecting means comprises a switch means for momentarily connecting said voltage source to said first signal input port.

13. In a speed control system for automobiles having throttle regulated propulsive means,
means generating a first electrical signal proportional to automobile speed,
means generating a second electrical signal proportional to said throttle position,
means combining said first and second electrical signals to provide an error signal, said combining means having at least one high input impedance port, said second signal being directly coupled into said combining means,
means capacitively coupling said first signal to said high input impedance port,
a constant voltage source,
means momentarily connecting said voltage source to said high input impedance port when the automobile attains a desired command speed, and
means positioning said throttle, said positioning means being responsive to said error signal.

14. The speed control system of claim 13 further distinguished by the fact that the total possible range of said first electrical signal is substantially greater than the total possible range of said second signal.

15. A speed control system for automobiles activated by a throttle regulated power source wherein a throttle positioning means is controlled by an error signal, comprising:
means generating a first electrical signal proportional to the difference between actual and desired automobile speed,
means generating a second electrical signal proportional to the position of said throttle, the total range of the magnitude of said second signal being substantially less than the total range of the magnitude of said first signal, the magnitude of said second signal at approximate half-open throttle position being equal to the magnitude of said first signal when actual speed equals desired speed, means combining said first and second signals to provide said error signal, means applying said error signal to said throttle positioning means.

References Cited

UNITED STATES PATENTS

| | | | |
|---|---|---|---|
| 3,409,102 | 11/1968 | Neapolitakis et al. | 180—109 |
| 2,980,369 | 4/1961 | Ruof | 317—5 X |
| 3,060,602 | 10/1962 | Buttenhoff | 180—105 X |
| 3,070,185 | 12/1962 | Fales. | |
| 3,116,807 | 1/1964 | Wilson | 180—109 |
| 3,172,497 | 3/1965 | Stoner et al. | |
| 3,198,985 | 8/1965 | Haskell. | |
| 3,249,175 | 5/1966 | Baxter | 180—108 |
| 3,319,733 | 5/1967 | Rath et al. | 180—106 |

KENNETH H. BETTS, Primary Examiner

U.S. Cl. X.R.

123—102; 180—108